United States Patent
Fikse

[11] 3,806,198
[45] Apr. 23, 1974

[54] BOTTOM DUMP OPERATING MECHANISM

[75] Inventor: Lyman H. Fikse, Enumclaw, Wash.

[73] Assignee: Truckweld Equipment Co., Seattle, Wash.

[22] Filed: Aug. 2, 1972

[21] Appl. No.: 277,411

[52] U.S. Cl. ............................... 298/30, 298/35 M
[51] Int. Cl. ............................................. B60p 1/56
[58] Field of Search ............ 298/30, 29, 27, 25, 37, 298/1 A, 17.6, 22 R, 35 M; 92/92, 48, 37; 105/250, 240

[56] References Cited
UNITED STATES PATENTS

| | | | |
|---|---|---|---|
| 2,927,541 | 3/1960 | Lunde | 298/35 M |
| 3,229,590 | 1/1966 | Huska | 92/48 |
| 693,132 | 2/1902 | Heiden | 105/250 |
| 2,401,407 | 6/1946 | Benbow | 298/35 M |
| 2,619,076 | 10/1952 | Agin | 92/48 |
| 3,198,086 | 8/1965 | Rager | 92/48 |
| 3,217,909 | 11/1965 | Heise | 298/30 |

FOREIGN PATENTS OR APPLICATIONS

| | | | |
|---|---|---|---|
| 800,118 | 9/1950 | Germany | 298/30 |

*Primary Examiner*—Richard J. Johnson
*Assistant Examiner*—Reinhard J. Eisenzopf

[57] ABSTRACT

An operating mechanism for a bottom dump hopper which is operated by a pair of opposed small volume air bags acting upon a force and distance-multiplying lever which through an overcenter linkage is connected to one gate of the clam shell closing gate. A linkage interconnects the two gates such that the movement of one causes an identical movement of the other.

4 Claims, 3 Drawing Figures

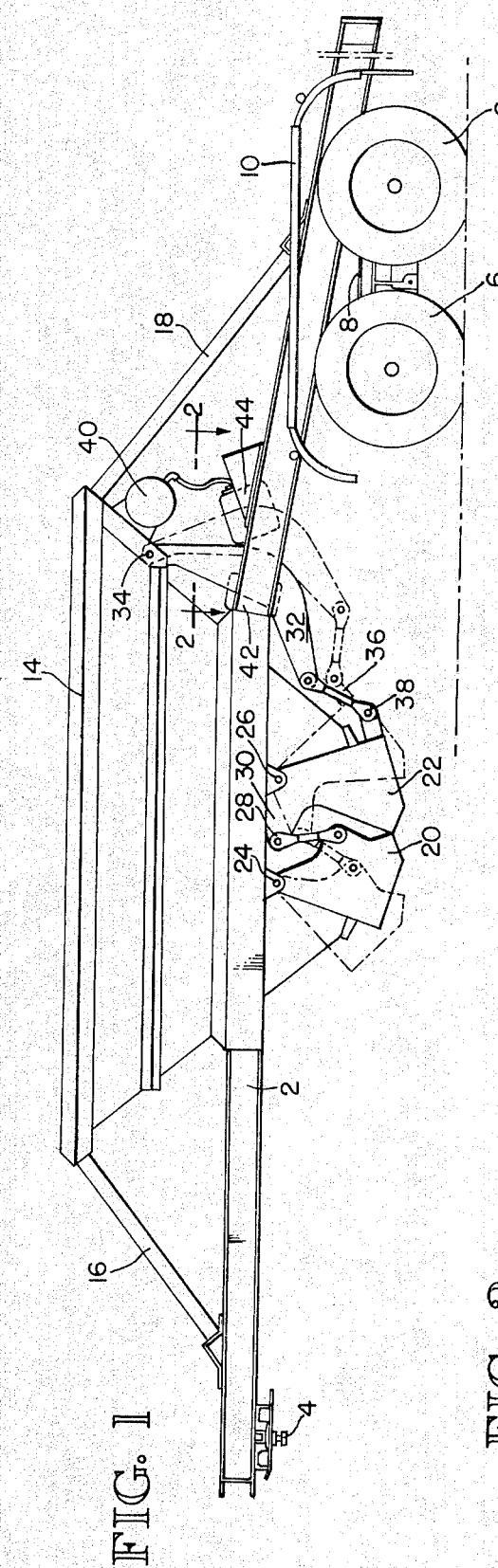
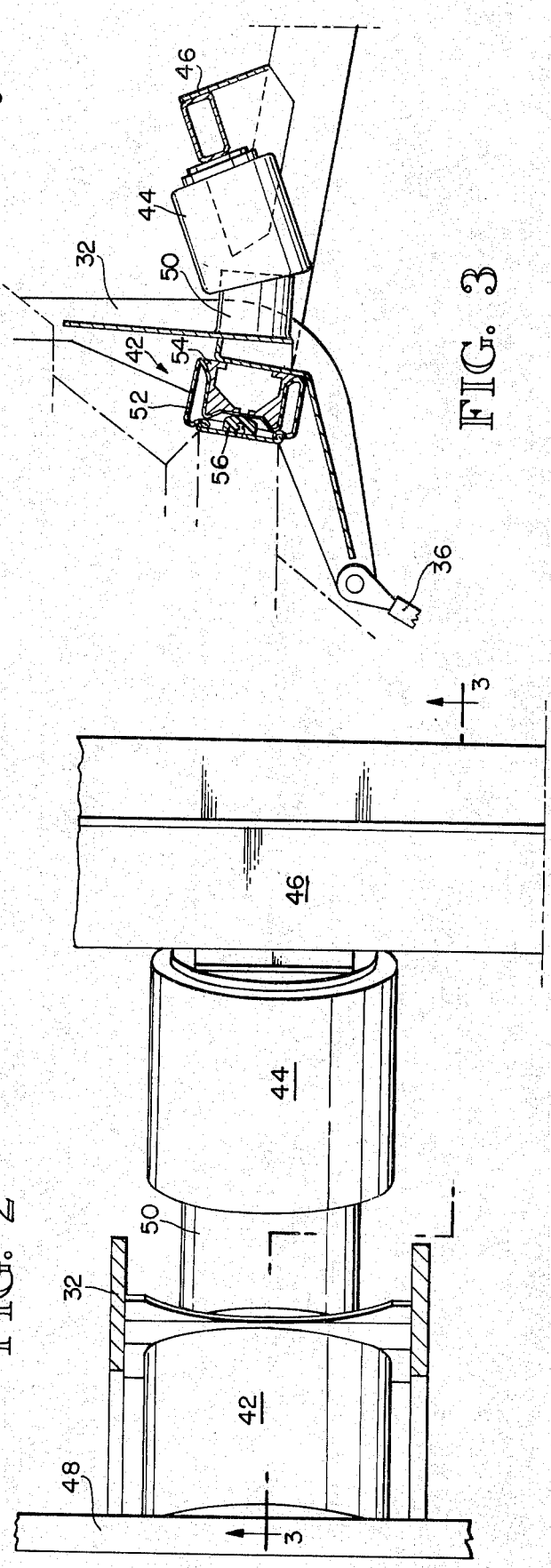
FIG. 1
FIG. 2
FIG. 3

BOTTOM DUMP OPERATING MECHANISM

BACKGROUND OF THE INVENTION

Field of the Invention

Bottom dump trailers or other structures having a hopper supported by a rigid framework and including a clam shell closure at the bottom of the hopper are well known in the art. The prior art clam shell closures for hopper bottoms have in general been operated by a plurality of air cylinders. Use of air cylinders or rams in this adverse environment generates many problems. The air cylinders, in order to generate sufficient force to close and open the gates, have required an exceedingly large volume of air. The requirement of air is such that if the operator were to open and close the gate more than once or twice, he must wait for the air in the truck's system to build up again in order to have sufficient air to operate the brakes and other mechanism necessary to a safe vehicle. Another drawback that has been noted in the use of air cylinders is the excess weight. When the mechanism is used upon a vehicle any excess weight lowers the payload of the vehicle. Pneumatic cylinders include exposed shafts which are subjected to wear and rust, thus causing air leakage through the seals around the shaft and a resultant inefficiency of the cylinders making this operating mechanism inefficient for use under such adverse conditions.

With the above noted problems in mind, it is an object of the present invention to provide a control system for a bottom dump hopper wherein the gates are quickly and effectively operated by a simple, inexpensive mechanism.

It is another object of the present invention to provide an operating mechanism for the clam shell gates of a bottom dump hopper wherein a great deal of force is generated through the use of very little of the available air.

Yet another object of the present invention is to provide a closing mechanism for the clam shell gate at the bottom of a bottom dump hopper including the use of a pair of extendable collapsible air bags mounted in opposing relationship such that introduction of fluid into one of the bags not only moves the clam shell gate, but further collapses the opposite air bag member.

Still another object of the present invention is to provide a force-multiplying linkage mechanism which greatly multiplies the force supplied to open and close the gates of a bottom dump hopper and further includes an overcenter locking position preventing the opening of the gates even if the air supply is exhausted.

Another object of the present invention is to provide a simple efficient bottom dump hopper control means for installation upon a mobile vehicle.

BRIEF DESCRIPTION OF THE DRAWINGS

FIG. 1 is a side elevational view of a typical bottom dump hopper supporting trailer including the clam shell gate and inventive operating mechanism.

FIG. 2 is a plan view along 2—2 of FIG. 1 showing the relative placement of the two force supplying collapsible air bags.

FIG. 3 is a vertical sectional view taken along lines 3—3 of FIG. 2 showing the relative location of the air bags and further showing the relationship of said bags to the force multiplying lever.

DETAILED DESCRIPTION OF THE DRAWINGS

As seen in FIG. 1, the inventive operative mechanism is mounted upon a bottom dump trailer having a frame 2 including a downwardly depending hitch 4 designed to interact with the conventional fifth wheel upon the tractor. The rear end of the trailer is supported by a pair of tandem wheels 6 and their axle and suspension system 8. A fender 10 is provided to protect the tires and further prevent mud or other debris from flying from the tires when the truck is in movement. The main central portion of the trailer comprises an inverted pyramidal shaped hopper 14 having lateral braces 16 and 18 securing the hopper to the trailer frame itself. Although shown and described with respect to a hopper mounted upon a trailer, the inventive clam shell gate operating mechanism is capable of utilization upon any bottom dump hopper and so is not intended to be limited to a trailer mounted unit.

The bottom of the hopper is closed by a pair of clam shell gate members 20, 22, which are pivotally mounted respectively at 24 and 26 to the hopper supporting framework.

Clam shell gates 20 and 22 are interconnected by a rigid link 28 which is pivotally secured to an outwardly projecting rigid arm or extension 30 of gate 22 at the upper portion thereof. Link 28 is also connected to gate 20 beneath the pivotal interconnection 24 such that pivotal movement of gate 22 about its connection 26 causes 20 to similarly pivot about its pivot point 24.

The mechanism for opening and closing the gates 20 and 22 which, when closed completely, terminate flow from the bottom of the hopper comprises a first link or lever member 32 pivotally mounted to the upper portion of the hopper at 34 and is of a general wide "V" configuration. Lever member 32 has one leg of the V secured at 34 and is oriented such that the second leg extends generally toward the bottom of the hopper. Pivotally secured to the outermost end of the second leg of lever 32 is a second rigid lever 36 which is similarly interconnected with the bottom rearward portion of the closest gate 22.

When the lever 32 is moved, by means hereinafter described, it will cause link 36 to pivot about its connection with the gate as well as about its connection with the lever 32. When lever 32 is urged to its position closest to the hopper 14, the link 36 will be forced to an overcenter configuration; i.e., beyond a straight line drawn from the connection point 38 of lever 36 with the gate 22 and point 34 wherein lever 32 is secured to the hopper. The purpose for the overcenter position when the gate is closed is to prevent the movement of the gates responsive to a load upon the gates in the event that the air pressure is lost. Air pressure could be lost through a leak in a hose or simply through slow seepage when the mechanism sits for a fair amount of time.

When it is desirable to open the gate, lever 32 will be moved to its position shown in phantom lines in FIG. 1 and the lever 36 will be pulled from its overcenter position to the position shown in phantom which is the fully open position.

Mounted to the upper portion of the hopper is a storage tank 40 which could be mounted any place on the trailer. It is desirable, however, to have the storage tank as close to the air operated lever mechanisms as possible. The tank 40 receives air under pressure from the compressor driven by the tractor which supplies air for the air brakes and other operative mechanisms so that no additional equipment is necessary upon the tractor portion of the mobile unit.

Further to be seen in this figure are a pair of opposed air bags 42 and 44 which are mounted, as will be more specifically described hereinafter, in a manner whereat they, when expanded, will cause the lever 32 to move from its open to its closed position or vice versa.

Referring now to FIG. 2, it can be seen that the air bags 42 and 44 are mounted between a pair of lateral fixed support members 46 and 48. The lateral support members provide a solid base for the expansion and contraction of the air bags themselves channeling the force exerted to lever 32. The lever 32 extends between the opposing air bags and, as seen in this figure, is of a general "I" configuration when taken in cross section. The cross-sectional configuration of lever 32 is not critical to the invention but does provide maximum strength for the given weight. The air bags operate upon a pedestal 50 which is secured to the portion of the lever 32 at an appropriate distance from the fulcrum to achieve the necessary force multiplication.

As seen in FIG. 3, the air bag 42 which is shown in its collapsed condition, includes a diaphragm 52, a pedestal 54 and an elastomeric rubber stop 56. It is to be understood that air bag 44 is identical and will not be described in detail. When the air bag 42 is expanded, it will cause a lever 32 to move to the right as seen in this figure, collapsing air bag 44 and opening the gate. To close the gate air bag 44 is expanded, moving the lever 32 to the position shown in this figure and putting lever 36 in its overcenter position as hereinabove described. Although not shown, it is obvious that there will be an air hose supplying air to each of the air bags from the storage tank 40 and suitable valve means will be placed within the cab of the vehicle for opening and closing the gates from a remote location.

It is to be understood that although the preferred embodiment is described with reference to a vehicle, the inventive mechanism is equally well adapted for use upon any sort of hopper device. In particular the gate operating mechanism is readily adaptable to chip bins, sand and gravel hoppers, or the like.

Thus it can be seen that the present operating mechanism provides a simple, inexpensive and extremely low cost operating mechanism for use upon a clam shell gate bottom dump hopper. In addition to the above advantages, the present mechanism is of minimal weight and is essentially maintenance free.

The embodiments of the invention in which an exclusive property or privilege is claimed are defined as follows:

1. Operating mechanism for opening and closing the gates of a bottom dump hopper, comprising:
   rigid lever means having a first end pivotally secured to said hopper at a point spaced from the bottom of the hopper,
   second lever means comprising rigid over center linking and locking means intermediate and interconnecting the second end of the rigid lever means and one of the gates,
   means to interconnect the gates whereby movement of one of the gates causes movement of the other, a pair of opposing air bag means mounted adjacent the rigid lever means and intermediate the ends thereof serving as a force producing element upon the lever for opening, closing and locking the gates, whereby a small volume of air may be utilized to generate large forces and substantial movement of the gate, and
   means for selectively inflating either of the air bags to open or close the gates.

2. Operating mechanism as in claim 1 wherein the gate member which has the second lever means mounted thereon includes an outwardly extending arm portion which moves downwardly when the gate member is opened, a rigid link secured to the arm portion and extending to the second gate member where it is secured such that movement at the first gate member causes similar movement at this second gate member.

3. Operating mechanism as in claim 1 wherein the mechanism is mounted upon a vehicle.

4. Operatine mechanism as in claim 1 wherein the mechanism is mounted upon a stationary hopper mechanism.

* * * * *